United States Patent [19]

McSpadden et al.

[11] Patent Number: 5,419,118
[45] Date of Patent: May 30, 1995

[54] MULTI-STAGE ROCKET MOTORS

[75] Inventors: Hugh J. McSpadden, Glendale; Donald E. Olander, Tempe, both of Ariz.

[73] Assignee: Universal Propulsion Company, Inc., Phoenix, Ariz.

[21] Appl. No.: 183,726

[22] Filed: Jan. 19, 1994

[51] Int. Cl.6 .................................................. F02K 9/28
[52] U.S. Cl. ........................................ 60/250; 60/254
[58] Field of Search ................. 60/250, 251, 244, 245, 60/253, 254, 256; 102/287

[56] References Cited

U.S. PATENT DOCUMENTS

| | | | |
|---|---|---|---|
| 3,442,084 | 5/1969 | Dilchert | 60/250 |
| 3,888,079 | 6/1975 | Diesinger et al. | 60/354 |
| 3,968,980 | 7/1976 | Hay | 60/254 |
| 4,075,832 | 2/1978 | Diesinger et al. | 60/250 |
| 5,160,070 | 11/1992 | Hibler et al. | 60/250 |

Primary Examiner—Timothy S. Thorpe
Attorney, Agent, or Firm—Ellsworth R. Roston; Charles H. Schwartz

[57] ABSTRACT

A motor for impelling a missile or projectile has a housing and a plurality of spaced walls defining progressive compartments in the housing. A nozzle in one of the compartments produces a thrust for the missile or projectile when pressurized gases flow through it. Igniters extending into the individual compartments ignite propellants in such compartments. The igniter in an individual one of the compartments is energized initially and the igniters progressively displaced from such individual compartment are thereafter energized sequentially. Each wall separating an individual pair of adjacent compartments has a normally closed valve. Each valve has a first orifice of relatively great area in the compartment closer to the nozzle and a second orifice of limited area in the compartment further from the nozzle. A membrane between the orifices prevents the valve from being opened by a pressure from the closer compartment until this pressure becomes relatively great (e.g. 6500 psi). When a comparatively low pressure (e.g. 1500 psi) is applied in the second orifice by propellant combusting in the further compartment, the membrane ruptures. The rupture is facilitated by dimpling the membrane in the direction from the second orifice toward the first orifice. When the membrane is ruptured, gases from the propellant combusting in the further compartment flow through the valve and then through the nozzle and gradually erode the membrane and orifice. This causes the gases in the compartments to be maintained at equal pressures sufficiently great to sustain the propellant combustion in the further compartment.

23 Claims, 2 Drawing Sheets

MULTI-STAGE ROCKET MOTORS

This invention relates to a motor for impelling a missile or a projectile. More particularly, this invention relates to a multi-pulse motor for providing a reliable and efficient propulsion of a missile or a projectile.

It has been recognized that missiles or projectiles powered by multi-pulse motors can often achieve a greater range with the same amount of propellant than a missile powered by a motor providing a constant combustion of propellant. A multi-pulse motor provides a progression of compartments and disposes propellant in each compartment. One of the compartments has a nozzle. The propellant in the compartment with the nozzle is initially combusted to produce gases which pass through the nozzle to generate thrust for impelling the missile or projectile. The propellants in the compartments progressively displaced from the nozzle are then sequentially combusted to provide successive bursts of thrust energy. The time between the successive bursts of thrust energy may be adjusted depending upon the acceleration and speed desired for the missile or projectile at each instant. The successive bursts of thrust energy may even be regulated so that the progressive bursts appear to constitute a substantially constant generation of energy.

In a multi-pulse motor, each of the progressive compartments is separated from the adjacent compartments by a wall. A valve is disposed in the wall. The valve is normally closed. The valve is constructed to withstand a relatively high pressure (e.g. 6500 psi) in a direction from the compartment closer to the nozzle toward the compartment further from the nozzle. In the other direction, the valve opens at a reduced pressure such as 1500 psi. When the valve opens, the pressure in the two compartments common to the valve falls to a relatively low value considerably below one thousand (1000) psi.

In recent years, propellants have been formulated which do not produce smoke when they combust. This is desirable in preventing an enemy from determining the location of the aircraft or vehicle which launched the missile or projectile holding the propellant. If the enemy could determine the location of such aircraft or vehicle, it could immediately provide counter measures against such vehicle or aircraft and destroy such vehicle or aircraft. The use of ammonium nitrate in the propellant is also desirable since the propellant is relatively insensitive to conditions which would cause the propellant to deflagrate, explode or detonate at undesirable times.

Propellants including ammonium nitrate have one (1) disadvantage. After being ignited, they often continue to combust only at pressures of at least approximately one thousand pounds per square inch (1000 psi). Furthermore, such propellants have been frequently known to become extinguished under rapid depressurization. At best, they tend to burn slowly at low pressures so that an extended period of time is required to pressurize the compartments in which propellants have previously combusted.

All of the disadvantages discussed in the previous paragraph in propellants including ammonium nitrate have made it difficult to provide such propellants in multi-pulse motors. In these motors, the opening of the valves between adjacent pairs of compartments has often caused the propellants to become extinguished because the pressures in the compartments have decreased below approximately one thousand pounds per square inch (1000 psi). This problem has been recognized for some time but a solution to the problem has not been provided as yet.

This invention provides a multi-pulse motor which satisfactorily resolves the problems discussed above. It provides a plurality of compartments and stores propellants including ammonium nitrate in the compartments. When the propellant in a particular compartment is ignited, the propellant initially produces a pressure of approximately fifteen hundred pounds per square inch (1500 psi) in the compartment. This causes a valve disposed between such particular compartment and the previously combusted compartment to become opened and a pressure of approximately one thousand pounds per square inch (1000 psi) to be produced in such particular compartment. This pressure is sufficient to maintain the combustion in such particular compartment at a high rate. In this way, the motor is able to operate with a high efficiency in producing a thrust for propelling a missile or a projectile.

In one embodiment, a motor for impelling a missile or projectile has a housing and a plurality of spaced walls defining progressive compartments in the housing. A nozzle in one of the compartments produces a thrust for the missile or projectile when pressurized gases flow through it. Igniters extending into the individual compartments ignite propellants in such compartments. The igniter in an individual one of the compartments is energized initially and the igniters progressively displaced from such individual compartment are thereafter energized sequentially.

Each wall separating an individual pair of adjacent compartments has a normally closed valve. Each valve has a first orifice of relatively great area in the compartment closer to the nozzle and a second orifice of limited area in the compartment further from the nozzle. A membrane between the orifices prevents the valve from being opened by a pressure from the closer compartment until this pressure becomes relatively great (e.g. 6500 psi).

When a comparatively low pressure (e.g. 1500 psi) is applied in the second orifice by propellant combusting in the further compartment, the membrane ruptures. The rupture is facilitated by dimpling the membrane in the direction from the second orifice toward the first orifice. When the membrane is ruptured, gases from the propellant combusting in the further compartment flow through the valve and then through the nozzle. These gases gradually erode the membrane and orifice. This causes the gases in the further and closer compartments to be maintained at a pressure sufficiently great to sustain the propellant combustion in the further compartment.

Figure 2:
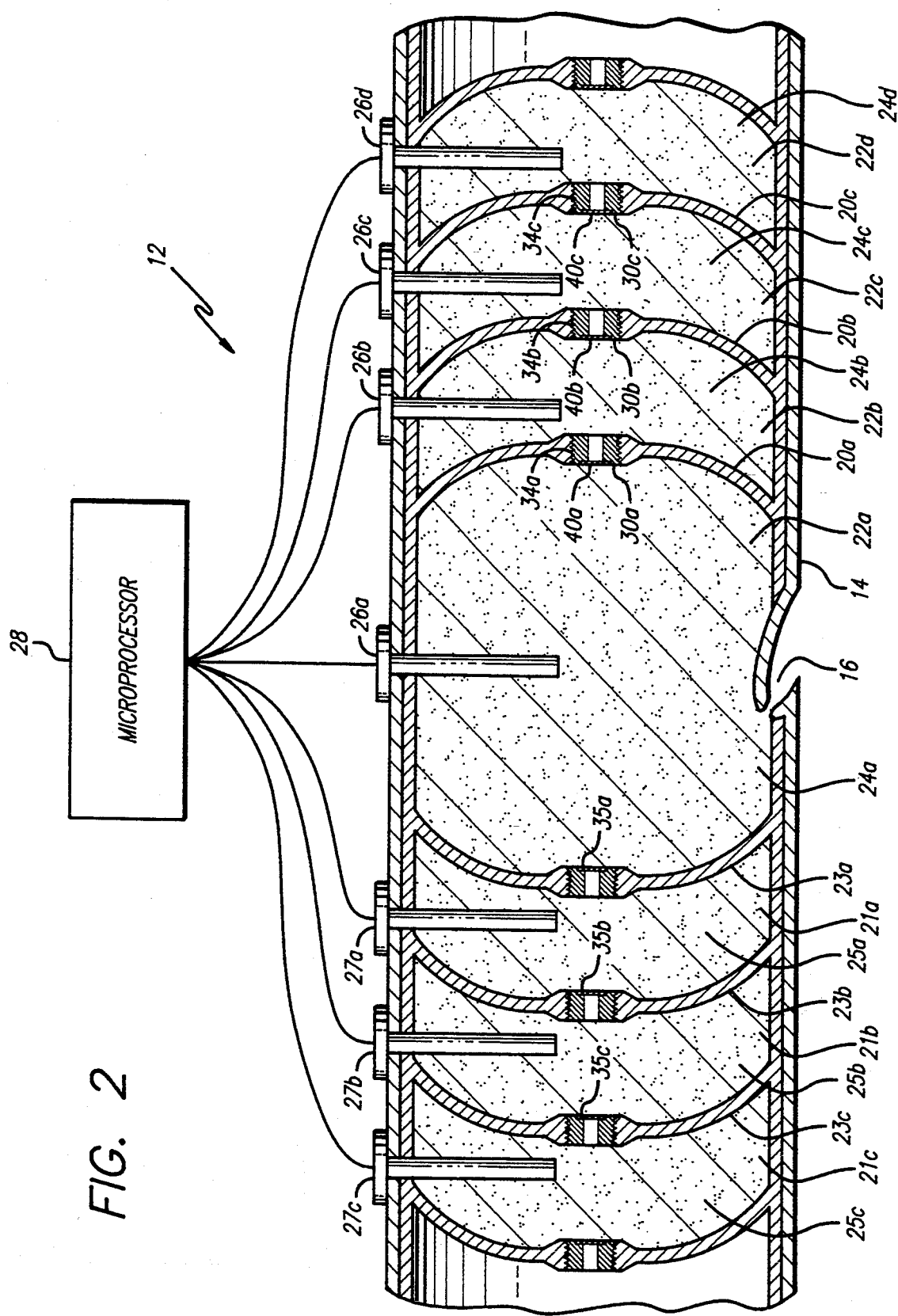
FIG. 2 is an enlarged sectional view of the multi-pulse motor shown in FIG. 1.

In one embodiment of the invention, a missile or projectile generally indicated at 10 is provided. The missile includes a multi-pulse motor generally indicated at 12 in FIG. 2. The motor 12 includes a housing 14 having a nozzle 16 in a compartment 22a. Gases under pressure pass through the nozzle 14 to propel the motor. Walls 20a, 20b, 20c, etc. extend from the housing 14 at progressively spaced positions to divide the motor into separate compartments 22b, 22d, 22d, etc. Similar compartments 21a, 21b, 21b, etc. may be defined by walls 23a, 23b, 23c, etc., on the other side of the compartment 22a.

Propellants 24a, 24b, 24c, etc. are respectively disposed in the compartments 22a, 22b, 22c, etc. The propellants 24a, 24b, 24c, etc. are well known in the art. Preferably they include ammonium nitrate as one of the materials in the propellant. Propellants including ammonium nitrate are desirable because they do not produce smoke when combusted and they are relatively stable. Propellants 25a, 25b, 25c, etc. are disposed in the compartments 21a, 21b, 21c, etc. The propellants 25a, 25b, 25c, etc., may have the same formulation as the propellants 24a, 24b, 24c, etc.

Igniters 26a, 26b, 26c, etc. respectively extend into the compartments 22a, 22b, 22c, etc. through the housing 14. The igniters 26a, 26b, 26c, etc., are well known in the art. For example, they may introduce electrical currents to the propellants 24a, 24b, 24c, etc., in the compartments 22a, 22b, 22c, etc., to ignite the propellants. Similar igniters 27a, 27b, 27c, etc. extend into the compartments 21a, 21b, 21c, etc. A microprocessor 28 may be connected to the igniters 26a, 26b, 26c, etc., and to the igniters 27a, 27b, 27c, etc., to control the times at which the igniters are individually energized. Valves 30a, 30b, 30c, etc. are respectively disposed in the walls 20a, 20b, 20c., etc. The valves 30a, 30b, 30c, etc. may be made from a suitable material such as a stainless steel although a number of other materials such as brass, steel and aluminum may also be used. The valves 30a, 30b, 30c, .etc. may be externally threaded (such as indicated at 32a for the valve 30a) to screw into mating threads in sockets (such as indicated at 34a for the valve 30a) in the walls 20a, 20b, 20c, etc. Similar valves 35a, 35b, 35c, etc., may be disposed in the compartments 21a, 21b, 21c, etc.

Figure 1:
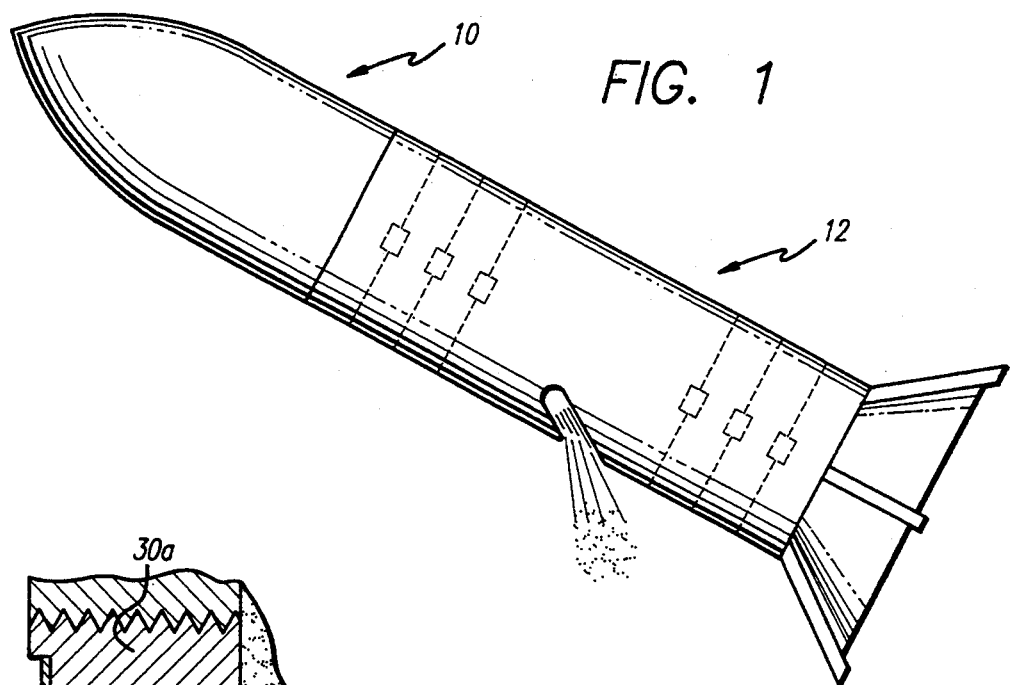
FIG. 1 is a perspective view of a missile or a projectile and of a multi-pulse motor attached to the missile or projectile.
Figure 3:
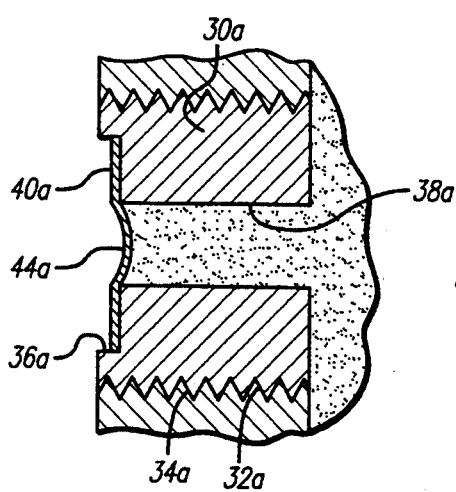
FIG. 3 is an enlarged sectional view of a valve before the valve has become opened, one of these valves being disposed between an adjacent pair of compartments in the multi-pulse motor shown in FIGS. 1 and 2.

The valves 30a, 30b, 30c, etc., may be respectively provided at one end with first orifices (such as indicated at 36a for the valve 30a) of relatively large diameter. The valves 30a, 30b, 30c, etc., may be respectively provided at its other end with orifices (such as indicated at 38a for the valve 30a) of relatively small diameter. For example, the valve 30a in FIGS. 3-5 has a relatively large orifice 36a of large diameter at the end of the valve closer to the nozzle 16. The valve 30a in FIGS. 3-5 has an orifice 38a of relatively small diameter at the end of the valve further from the nozzle 16.

Figure 4:
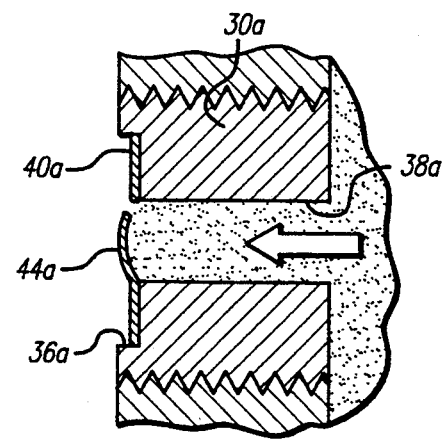
FIG. 4 is an enlarged sectional schematic view similar to that shown in FIG. 3 and shows a membrane in the valve after the membrane has become ruptured.
Figure 5:
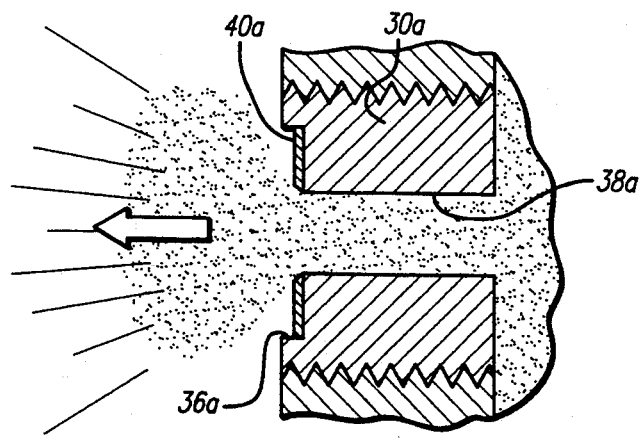
FIG. 5 is an enlarged sectional view similar to that shown in FIG. 3 and shows the valve after the membrane has been eroded.

Membranes (such as a membrane 40a for the valve 30a) respectively separate the orifices in the valves 30a, 30b, 30c, etc. The membranes such as the membrane 40a may be relatively thin such as with a thickness of approximately one thirty second of an inch (1/32"). The membranes such as the membrane 40a may be respectively dimpled, as shown at 44a in FIGS. 3 and 4 for the valve 30a in the directions of the orifices such as the orifice 38a. When a sufficient force is applied through the orifices such as the orifice 38a against the membranes such as the membrane 40a, the membranes pop so that the dimples face the orifices such as the orifice 36a. This is shown in FIG. 4 for the membrane 40a.

The propellant 24a in the compartment 22a is initially ignited by energizing the igniter 26a. The gases generated as a result of the combustion of the propellant 24a pass through the nozzle 16 and produce a thrust for propelling the missile or projectile 10. When the combustion of the propellant 24a has been substantially completed, the igniter 26b is energized by a signal from the microprocessor 28 to obtain a combustion of the propellant 24b in the compartment 22b. The gases accumulated in the compartment 22b from such combustion cause the membrane 40a in the valve 30a to become ruptured when such gases reach a pressure of approximately fifteen hundred pounds per square inch (1500 psi). This is shown in FIG. 4. The gases in the compartment 22b then pass into the compartment 22a and through the nozzle 16 to produce a thrust for propelling the missile or projectile 10.

As the propellant 24b in the compartment 22b continues to burn, the pressure of the gases in the compartment 22a reaches a value such as approximately one thousand pounds per square inch (1000 psi). This results from the progressive erosion of the dimpled portion of the membrane 40a by the combustion of gases as these gases pass through the orifice 38a. This results in part from the ratio between the area occupied by the orifice 38a and the area of the nozzle 16. For example, the cross-sectional area of the orifice 38a may be approximately two and one half (2½) times the area of the nozzle 16 so that the pressure of the gases passing through the nozzle is approximately twenty five hundred pounds per square inch (2500 psi). The gases flowing through the nozzle 16 at this pressure are sonic.

Since the pressure in the orifice 38a is maintained at a value of at least one thousand pounds per square inch (1000 psi), the propellant 24b in the compartment 22b is able to continue burning at an optimum rate even when ammonium nitrate is included in the propellant. This assures that the motor 12 will be able to provide an optimal thrust in propelling the missile or projectile 10. In like manner, the igniter 26c is thereafter energized by the microprocessor 28 to combust the propellant 24c and produce an opening of the valve 30b. When this occurs, the compartments 22a, 22b and 22c receive a gas pressure of approximately one thousand pounds per square inch (1000 psi). The gases then pass through the nozzle 16 and propel the missile or projectile 16.

The pressurized gases in the compartment 22c maintain the combustion of the propellant 24c to provide for an optimal propulsion of the missile or projectile 16. The subsequent combustions of the propellants 24d, etc. produce similar thrusts of energy through the nozzle 16 to propel the missile or projectile 16. The propellants in the compartments 21a, 21b, 21c, etc, may be combusted after the combustion of the propellants in the compartments 22a, 22b, 22d, etc., or alternately with the combustion of the propellants in the compartments 22a, 22b, 22c, 22d, etc.

The provision of the single orifices in the valves 30a, 30b, 30c, etc., and in the valves 35a, 35b, 35c, etc., offers certain advantages. One advantage, of course, is that desired pressures are obtained of approximately one thousand pounds per square inch (1000 psi) in the orifices in the valves and twenty five hundred pounds per square inch (2500 psi) in the nozzle 16 as the propellants 24a, 24b, 24c, etc. and 25a, 25b, 25c, etc., burn. The provision of the single orifices in the valves 30a, 30b, 30c, etc. and the valves 35a, 35b, 35c, etc., also minimizes the possibility of impact by metal fragments released during the combustion of the propellants and the thrust of the rocket motor 12.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination in a rocket motor,
a housing,
a plurality of compartments disposed in a progressive arrangement in the housing, each compartment containing a propellant and means for igniting the propellant,
there being a nozzle in one of the compartments, and
a plurality of valves each disposed between an individual pair of adjacent compartments in the progressive arrangement and each operative to pass gases of combustion between the individual pair of adjacent compartments in the direction toward the nozzle during the combustion of the propellant in the compartment further removed from the nozzle in the individual pair of adjacent compartments and to prevent the passage of gases of combustion between the individual pair of nozzles in the direction away from the nozzle during the combustion of the propellant in the compartment closer to the nozzle in the individual pair of adjacent compartments,
each valve including first and second orifices, the first orifice in each valve being closer to the nozzle than the second orifice and being larger than the second orifice and a rupturable member being disposed in the first orifice and covering the second orifice before becoming ruptured and isolating the second compartment from the first compartment before becoming combusted.

2. In a combination as set forth in claim 1,
the valve between each individual pair of adjacent compartments being constructed to provide a particular pressure between such compartments after the initiation of the combustion of the propellant in the compartment further away from the nozzle in such individual pair and after the rupture of the membrane in the valve separating such individual pair of adjacent compartments and during the combustion of the propellant in the compartment further away from the nozzle in such individual pair, the particular pressure having a value to maintain the combustion of the propellant in such compartment.

3. In a combination as set forth in claim 2,
the valve between the compartments in the individual pair being normally closed to prevent gases of propellant combustion from flowing between the compartments and being constructed to become opened upon the production of a particular gas pressure in the compartment further away from the nozzle in such individual pair as a result of the combustion of the propellant in such compartment and the rupture of the membrane in the valve between such individual pair of compartments,
there being only a single membrane in each valve.

4. In a combination as set forth in claim 2,
the particular pressure constituting a first particular pressure,
the valve between the compartments in the individual pair being normally closed to prevent gases of propellant combustion in either of the compartments in the individual pair from passing to the other compartment in the individual pair and being constructed to become opened upon the production of a second particular gas pressure in the compartment further away from the nozzle in such individual pair as a result of the combustion of the propellant in such compartment, the second particular pressure being greater than the first particular pressure but less than the pressure required to open the valve in the compartment closer to the nozzle in the individual pair,
the membrane in each valve being made from a material to become eroded, after the rupture of the membrane by the passage through the second orifice in such valve of the gases produced by the combustion of the propellant in the compartment adjacent such valve but further removed from the nozzle than such valve.

5. In a combination as set forth in claim 1,
the propellant including ammonium nitrate,
each valve being provided with only the first and second orifices and only the single membrane and the second orifice being provided with dimensions relative to the dimensions of the nozzle to maintain the gases in the compartment further from the nozzle in the individual pair at a pressure above that for maintaining the combustion of the propellant in such compartment.

6. In combination in a rocket motor,
a housing,
a wall separating the housing into first and second compartments,
a nozzle in the housing of the first compartment to provide for the passage of gases through the nozzle and for the production of a thrust by the rocket motor as a result of such gas passage,
a propellant in each of the first and second compartments,
means disposed in each of the first and second compartments for individually igniting the propellant in such compartment,
a valve disposed in the wall and constructed to close each compartment from the other and to provide for an opening of the valve upon the production of a first particular gas pressure in the second compartment as a result of the combustion of the propellant in the second compartment and to produce a second particular gas pressure in the first and second compartments during the combustion of the propellant in the second compartment, the second particular pressure being less than the first particular pressure but sufficient to maintain the combustion of the propellant in the second compartment, and
means for timing the operation of the igniting means t initially obtain an ignition of the propellant in the first compartment and then an ignition of the propellant in the second compartment,
the valve being made from a single member having only first and second orifices and having a single rupturable membrane closing the second orifice from the first orifice before the rupture of the membrane.

7. In a combination as set forth in claim 6,
the timing means being operative to ignite the propellant in the second compartment substantially after the completion of the combustion of the propellant in the first compartment,
the valve being formed from a single member having only first and second orifices and having a single rupturable membrane closing the second orifice from the first orifice before the rupture of the member,
the single rupturable member in each valve being made from a single element having a single layer in such single element.

8. In a combination as set forth in claim 6,
the valve including the first orifice in the first compartment and the second orifice in the second compartment and the membrane being disposed to separate the first and second orifices, the membrane being rupturable upon the imposition of a third particular pressure on the membrane in the direction away from the nozzle or upon the imposition of the first particular pressure on the membrane in the direction toward the nozzle, the third particular pressure being greater than the first and second particular pressures.

9. In a combination as set forth in claim 8,
the membrane being constructed from a material which becomes eroded during the combustion of the propellant in the second compartment to obtain the production of the second particular pressure in the first and second compartments during the combustion of the propellant in the second compartment.

10. In a combination as set forth in claim 6,
the propellant including ammonium nitrate,
the membrane being made from a single element having only a single layer in such single element.

11. In a combination as set forth in claim 10,
the relative dimensions of the nozzle and the orifice providing for the production of a greater pressure in the nozzle than the first and second particular pressures and providing for the production of the second particular pressure in the second compartment during the combustion of the propellant in the second compartment to maintain the combustion of the propellant in the second compartment.

12. In combination in a rocket motor,
a housing,
a plurality of walls disposed at progressive positions in the housing to separate the housing into a plurality of progressively disposed compartments,
a plurality of propellants each disposed in an individual one of the compartments,
a plurality of ignition means each disposed in an individual one of the compartments to ignite the propellant that compartment,
a nozzle in a first one of the compartments to pass the gases from the combustion of the propellant in the first compartment for the production of a thrust by the rocket motor,
a plurality of valves each disposed in the wall between an individual pair of adjacent compartments in the plurality and each constructed to close the individual pair of adjacent compartments from each other and to become opened only upon the production of a first particular gas pressure between the pair of adjacent compartments in a direction toward the nozzle as a result of the initiation of combustion of the propellant in the compartment further from the nozzle in the individual pair and to maintain the pressure of the gases between the compartments in the direction toward the nozzle at a second particular pressure less than the first particular pressure but sufficient to maintain the combustion of the propellant in the compartment further from the nozzle in the individual pair, and
each of the valves having a first orifice in the compartment closer in the individual pair to the nozzle and a second orifice in the compartment further in the individual pair from the nozzle, the first orifice having a greater area than the second orifice to provide for an opening of the valve in the direction toward the second orifice only by a gas pressure greater in the first orifice than the first and second particular pressures,
each of the valves having a membrane normally closing the first and second orifices from each other and rupturable by the first particular pressure in the compartment further in the individual pair from the nozzle.

13. In a combination as set forth in claim 12,
the membrane in each of the valves being dimpled in the direction of the second orifice in such valve, the dimple in such membrane being rupturable in the direction of the first orifice upon the imposition of the first particular pressure in the second orifice and to provide for the production of the second particular pressure in the second orifice upon becoming ruptured,
there being only one membrane in each of the valves.

14. In a combination as set forth in claim 12,
the membrane in each of the valves being made from a material to become eroded by the production of gases resulting from the combustion of the propellant in the compartment further in the individual pair from the nozzle and to provide for the production of the second particular pressure in the second orifice during the combustion of the propellant in the compartment further in the individual pair from the nozzle.

15. In a combination as set forth in claim 14,
means for timing the operation of the ignition means in the plurality to obtain the combustion of the propellants at progressive instants of time in the progressive compartments in the direction away from the nozzle,
the membrane being made from a material which is eroded by the gases passing through the second nozzle after the rupture of the membrane as a result of the combustion of the propellant in the compartment further in the individual pair from the nozzle, there being only one membrane in each valve and the first and second orifices being the only orifices in each valve during the combustion of the propellant in the compartment further in the individual pair from the nozzle.

16. In a combination as set forth in claim 15,
each of the membranes being dimpled in the direction of the second orifice, the dimple being movable in the direction of the first orifice upon the imposition of the first particular pressure in the second orifice to become ruptured and to provide for the production of the second particular pressure in the second orifice.

17. In a combination as set forth in claim 16,
a missile connected to the housing to be impelled by the thrust of the rocket motor,
the membrane in each valve being made from a single element having only a single layer in such element.

18. In a combination as set forth in claim 12,
the propellant including ammonium nitrate, the first orifice being larger than the second orifice in each valve and the second orifice in each valve having a cross sectional area relative to the cross sectional area of the nozzle to provide a pressure of at least 1000 psi in the compartment further in the individual pair from the nozzle during the combustion of the propellant in such further compartment.

19. In combination,
a missile,
a rocket motor attached to the missile,
the missile and the rocket motor having a housing,
a plurality of walls extending from the housing at spaced positions in the rocket motor to separate the motor into a plurality of progressively disposed compartments,
a nozzle in a first one of the compartments,
a plurality of valves each disposed in an individual one of the walls, each of the valves being constructed to withstand a first particular pressure in the direction away from the nozzle and to withstand a second particular pressure in the direction toward the nozzle, the first particular pressure being greater than the second particular pressure,
a plurality of propellants each disposed in an individual one of the compartments, and
a plurality of igniting means each extending into an individual one of the compartments for igniting the propellant in such compartment,
each of the valves in the plurality being operative to maintain a third particular pressure in the compartments common to such valve after the propellant is ignited in the individual one of such common compartments further from the nozzle and while the propellant is thereafter combusting in such individual one of the common components, the third particular pressure being less than the first and second particular pressures and having a value at least equal to the pressure required to maintain the combustion of the propellant in such individual one of the common compartments.

20. In a combination as set forth in claim 19,
each of the propellants in the plurality including ammonium nitrate,
the third particular pressure having a value to maintain the combustion of the propellant in such individual one of the common compartments after the combustion in such compartment has been initiated.

21. In a combination as set forth in claim 20,
each of the valves having orifices in the compartments common to such valve and having a larger orifice in the compartment closer to the nozzle than in the compartment further from the nozzle and having a membrane between such orifices to withstand the first particular pressure in the direction away from the nozzle and to withstand the second particular pressure in the direction toward the nozzle,
the membrane in each valve being the only membrane in such valve and the first and second orifices in each valve being the only orifices in such valve.

22. In a combination as set forth in claim 21,
the membrane in each of the valves being dimpled in the direction away from the nozzle,
the membrane in each valve being made from a single element having only a single layer in such element.

23. In a combination as set forth in claim 21,
the membrane in each valve being made from a material having properties of rupturing upon the production of the second particular pressure against the membrane in the direction toward the nozzle and of becoming eroded by the gases of combustion of the propellant in the individual one of the compartments after such rupture.

* * * * *